(12) United States Patent
Lai (10) Patent No.: US 6,179,088 B1
(45) Date of Patent: *Jan. 30, 2001

(54) INTERLINKED WATERCOURSES FOR SUSHI BOATS

(76) Inventor: Len-Sun Lai, 2038 Firethorne Ct., Milpitas, CA (US) 95035

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/052,748

(22) Filed: Mar. 31, 1998

(51) Int. Cl.[7] .................................................. B65G 53/02
(52) U.S. Cl. .................................................. 186/49; 104/73
(58) Field of Search ................................. 186/49; 104/59, 104/73; 273/140; 472/13; 446/153, 159

(56) References Cited

U.S. PATENT DOCUMENTS

| | | | |
|---|---|---|---|
| 1,357,995 | * 11/1920 | Kitterman | 472/13 |
| 2,551,055 | * 5/1951 | Scharkopf | 104/73 |
| 4,063,517 | * 12/1977 | Nardozzi | 104/73 X |
| 4,429,867 | * 2/1984 | Barber | 104/73 X |
| 5,566,782 | 10/1996 | Iwamoto et al. | 186/49 |
| 5,637,025 | 6/1997 | Dahlgren | 446/153 |

* cited by examiner

Primary Examiner—F. J. Bartuska
(74) Attorney, Agent, or Firm—Thomas Schneck (57) ABSTRACT

Dining service is provided at locations surrounding a plurality of watercourse loops which are linked by shunts, allowing travel of sushi boats from one watercourse to another. This allows sushi chefs to be stationed within each watercourse loop preparing food at separate locations, yet allowing the food to circulate among all diners. Selectively movable gates may be used to close off watercourse loops or to divert boats in a manner such that either a single loop trip is made or a trip over extended loops is made. Watercourses are fabricated by joining modular sections of fiberglass liner, including straight sections, curved sections and Y-shaped sections. The food preparation region of each loop may be accessed by a tunnel beneath the loops, particularly useful for persons in wheelchairs.

14 Claims, 7 Drawing Sheets

INTERLINKED WATERCOURSES FOR SUSHI BOATS

TECHNICAL FIELD

The invention relates generally to food merchandising and, in particular, to dining room service with watercourse conveyors carrying food items.

BACKGROUND ART

U.S. Pat. No. 5,566,782 describes an oval watercourse carrying sushi boats for service of small sushi plates to customers seated around the watercourse. As boats pass the customers, customers remove small plates of selected food items. A sushi chef usually stands in the center of the oval watercourse, preparing the small plates and then loading the plates onto the sushi boats. At least a few boats are always circulating, bringing different choices of food items to the customers. A restaurant can itemize food items taken by customers by identification associated with the plates.

In sushi dining, quantities of food are typically small and the varieties of sushi are impressive. A person desiring to sample many of the offerings of a restaurant may wish to remove samples slowly, so that each sample will have a higher probability of freshness.

Although sushi diners are frequently deliberate in selection and consumption of food items, experienced sushi chefs are fast. This creates a mismatch between the ability to prepare food and consumption of it. Frequently, restaurants will add seating, apart from a watercourse so that food preparation capacity may be utilized. However, patrons using the additional seating must order from a menu and do not enjoy the entertainment provided by the circulating sushi boats.

An object of the present invention was to improve dining service in sushi restaurants by expanding watercourse delivery of food items.

SUMMARY OF INVENTION

The above object has been achieved by creating a plurality of spaced apart watercourse loops, linked by shunts, with the shunts allowing travel of sushi boats from one loop to another. Movable gates may be used to open and close the shunts so that boats may be directed to particular watercourses. Also, the gates may be used to block watercourses in the event that utilization of all watercourses is not desired, or to isolate particular watercourses or to group watercourses.

By using the present invention, different sushi chefs may load different watercourses, yet the boats from the different watercourses will be allowed to travel among all watercourses.

The watercourses are formed by modular pieces of water-impervious material, preferably fiberglass, including straight sections, curved sections, and Y-shaped sections, which are joined together. By using modular pieces, watercourses of various shapes may be designed. The cross-sectional shape of each watercourse is preferably rounded, with no angular corners thereby allowing for easy cleaning.

The watercourses are supported on a table have a central open region for food preparation and service. A subfloor pathway is provided beneath the watercourse for access to the central region, particularly for a wheelchair.

BEST MODE FOR CARRYING OUT THE INVENTION

Figure 1:
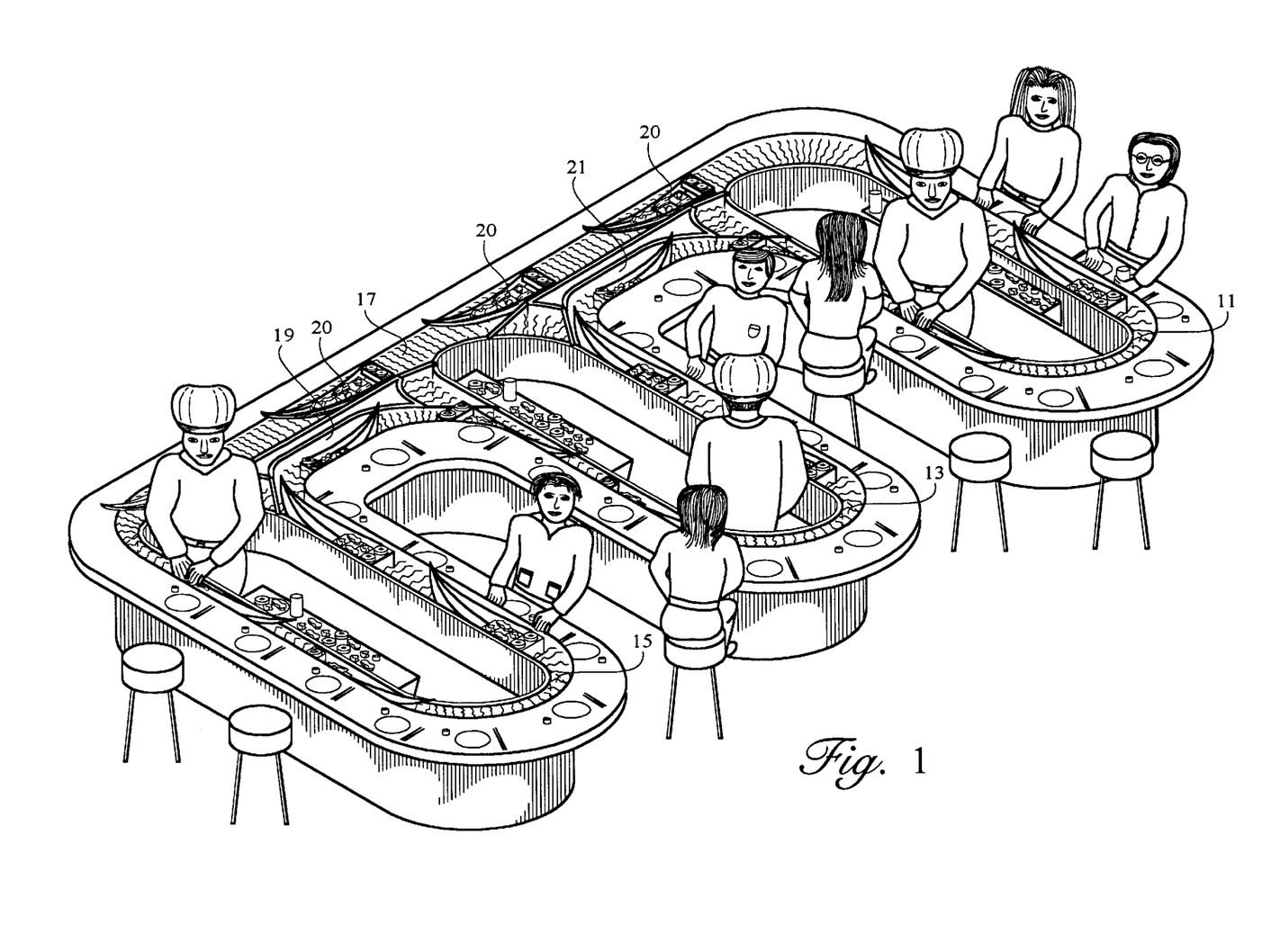
FIG. 1 is a perspective view of a plurality of spaced apart watercourse loops in a food service operation in accord with the present invention.

With reference to FIG. 1, a plurality of watercourses 11, 13 and 15, with water flow established by jets, are seen to be arranged in a parallel, spaced apart relation. The watercourses are interconnected by shunts. A first shunt 17 provides for motion of sushi boats 20 in one direction while shunt segments 19 and 21, comprising a second shunt, provide for sushi boat motion in an opposite direction. The watercourses have an oval shape with a sufficiently large central zone, allowing for occupancy of a chef and a food preparation area.

Customers are seated around a watercourse in position to observe the sushi boats and to remove food items from the boats as desired. The cross-sectional dimensions of the sushi boats fit closely within the cross-sectional dimensions of the watercourses, with the watercourses being slightly larger to allow free floating clearance. Small jets of water or air provide motive force for flow of water. Flow between watercourses is complementary so that boats exiting from one watercourse along a shunt, flow to the next watercourse because merging flows reinforce each other and do not oppose. The only opposition to passage of the boat from one watercourse to the next is by means of one or more gates which may be placed across the watercourse to block the path of a boat or to divert a boat in a desired direction. In the example of FIG. 1, boats which are loaded on watercourse 11 will emerge from that watercourse and flow toward watercourse 15 along shunt 17 and then circulate toward watercourse 13 traversing shunt 19 and then back to watercourse 11 via shunt 21.

Figure 2:
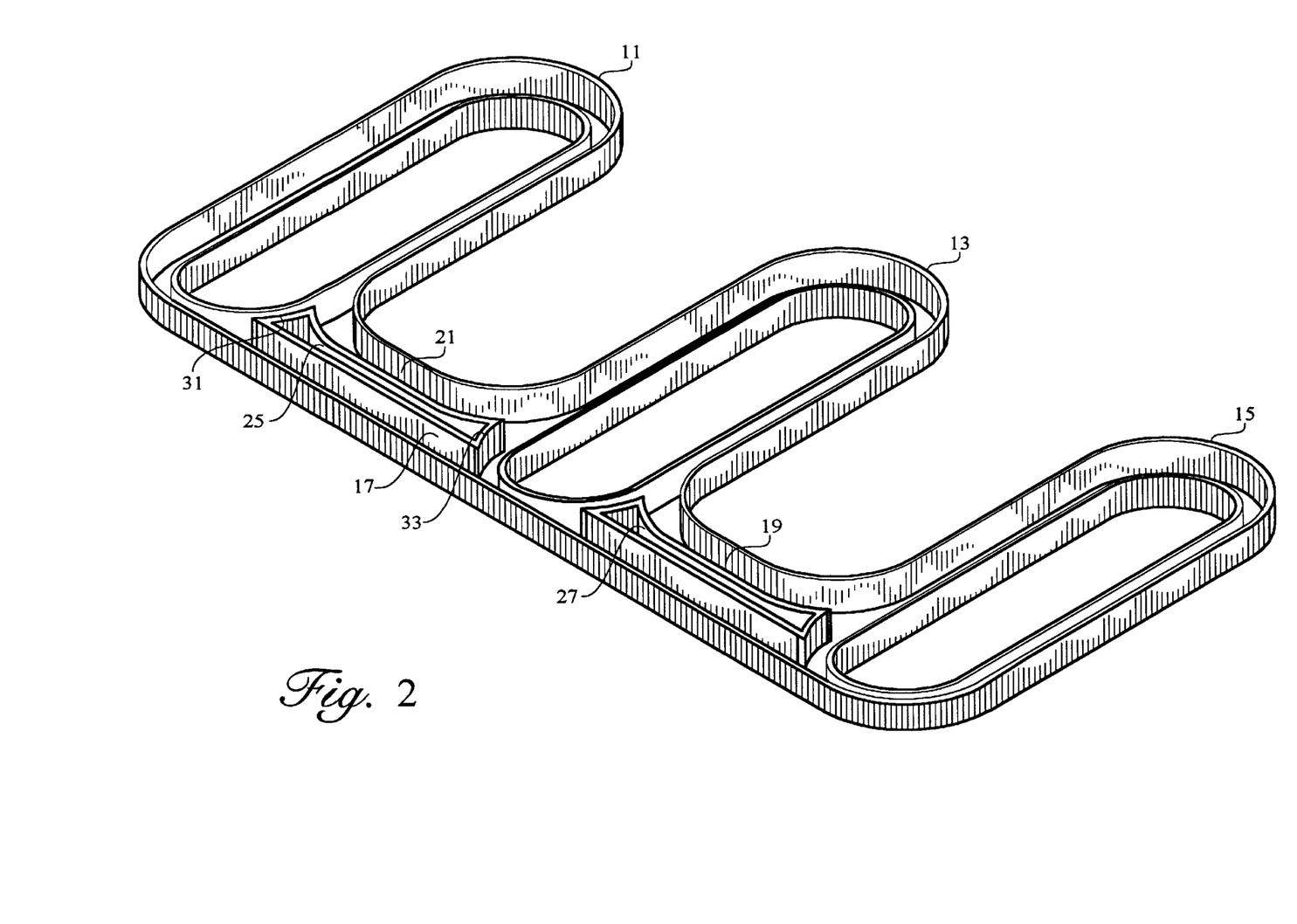
FIG. 2 is a perspective view of the watercourse loops of FIG. 1, without water.

In FIG. 2, the first shunt 17 and the shunt segments 19 and 21 are seen to be defined by islands 25 and 27. Each island is a flow barrier, with ends shaped to match the flow path of a watercourse. The islands also provide support for gates which are inserted to block or to divert boats within a watercourse or a shunt. For example, the island 25 has a bone shape with a first end 31 having a concave shape facing a curved section of the inner race of watercourse 11. A second end 33 has a concave shape facing in the opposite direction from end 31 and toward a curved portion of the inner race of watercourse 13. Island 27 has a similar structure.

Figure 3:
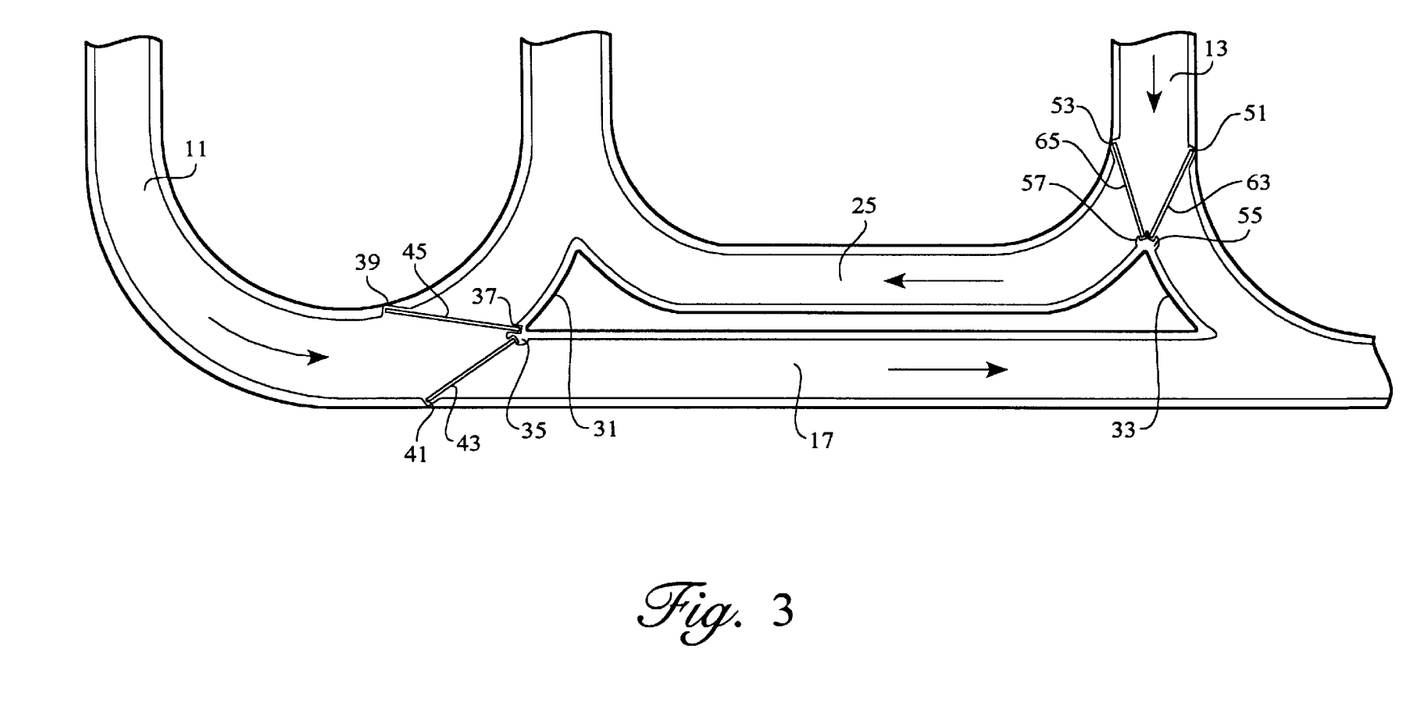
FIG. 3 is a top view of a portion of a plurality of watercourse loops, with gates placed in or near shunts connecting adjacent loops.

Island 25 may be seen in more detail in FIG. 3. The first end of island 25 may be seen to have first and second notches 35 and 37 receiving lateral edges of gates 43 and 45 respectively. Only one of gates 43 and 45 would be in place at one time, not both. Water flow in FIG. 3 is in the direction indicated by the arrows. A boat in watercourse 11 would be maintained in watercourse 11 if gate 43 is in place. On the other hand, if gate 45 is in place, the boat would be directed toward watercourse 13 through the first shunt 17. Receiving notches 39 and 41 in watercourse 11 secure the opposite lateral edges of gates 45 and 43 respectively. The gates are made of panel material which can be dropped into place. Alternatively, a turning gate could be used actuated by hand or by remote control. Such a turning gate is illustrated in U.S. Pat. No. 5,637,025, with the gate being manually operated. At end 33 of island 25, a pair of notches 55 and 57 receive lateral edges of gates 63 and 65 respectively. Only one of gates 63 and 65 is in place at one time diverting boats traveling in watercourse 13 to the right or left. The opposite edge of each gate is secured in a notch 51 or 53 in the wall of watercourse 13.

Figure 4:
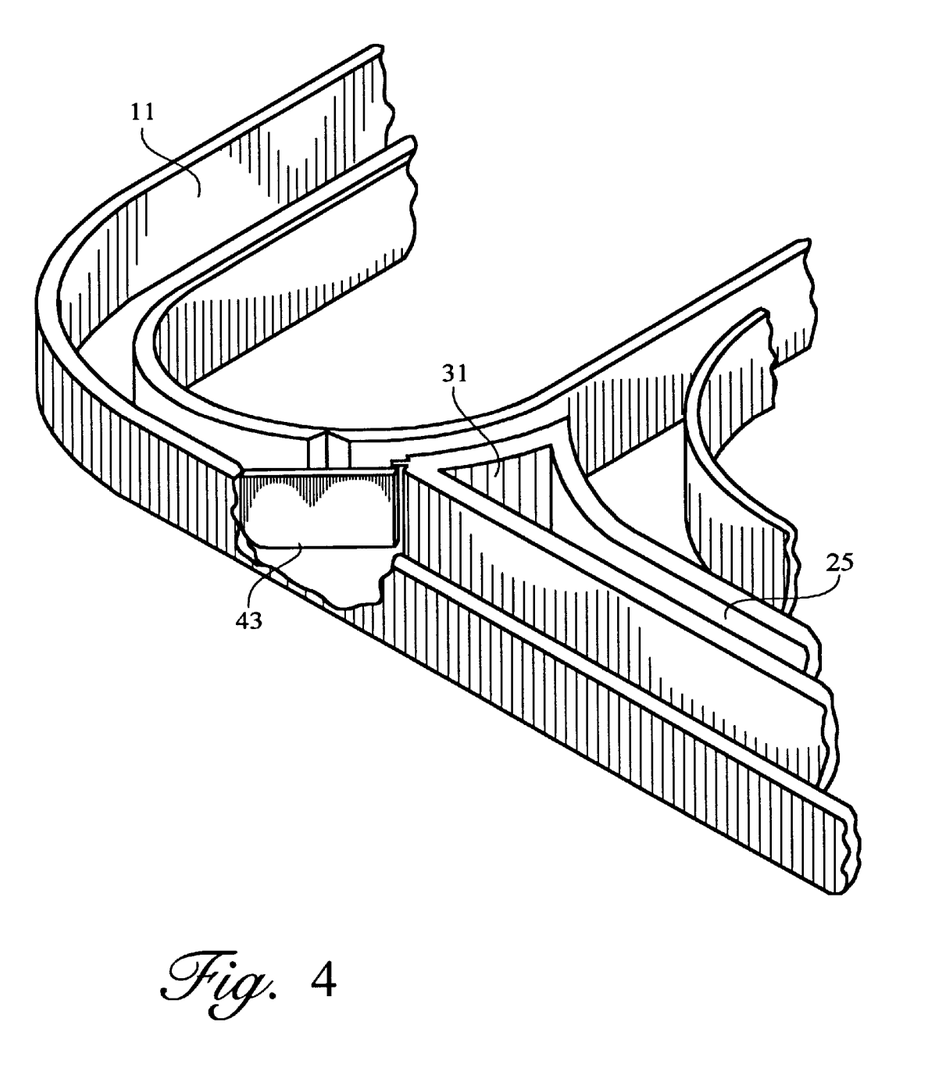
FIG. 4 is a perspective view of a plurality of watercourse loops with gates near shunts.

In FIG. 4, the gate 43 is seen to be perforated to allow water to flow therethrough but to block sushi boats traveling in watercourse 11 and forcing the boats to recirculate. The concave wall of island 25 serves to guide boats as they turn past gate 43. When gate 43 is removed or otherwise opened, the first shunt 17 becomes accessible to boats, allowing access to other watercourses.

Figure 5:
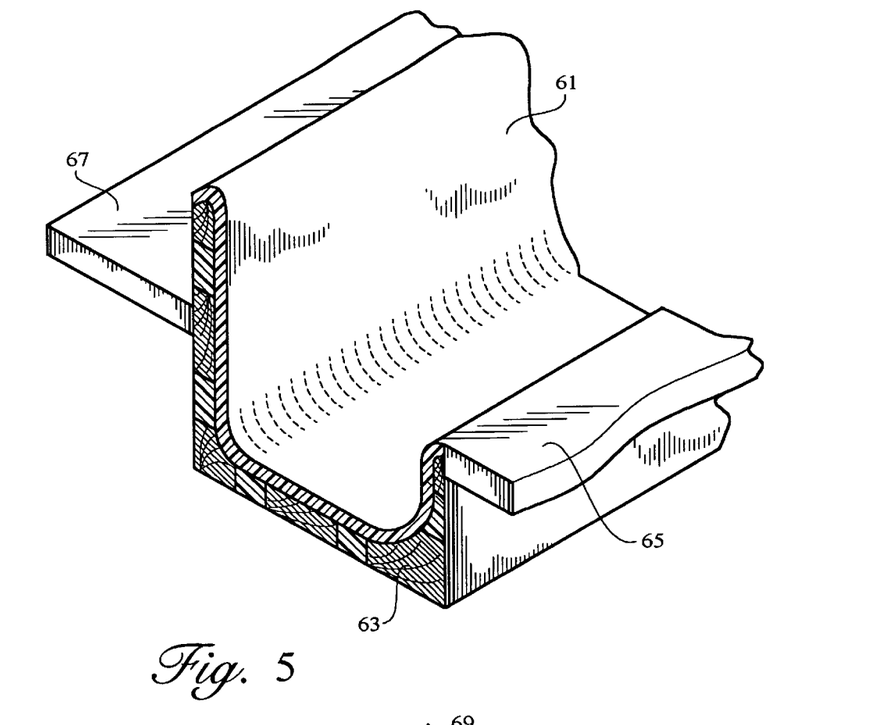
FIG. 5 is a perspective view of a section of a watercourse loop in accord with the present invention.

With reference to FIG. 5, a section of a watercourse may be seen. Each watercourse has an inner liner 61 and a support structure 63. The support structure has a flat bottom so that it may rest on a tabletop. The liner 61 has a U-shape, without corners where debris may be trapped. By providing rounded corners, the liner is easier to clean. The liner and support structure may be seen to be asymmetric with a lower side having an optional shelf 65 which may be used for food preparation or loading of sushi boats. The opposite side of the liner is higher, and is joined to an eating surface 67. The eating surface is kept below the upper wall of the liner to prevent food from falling into the watercourse.

Figure 6:
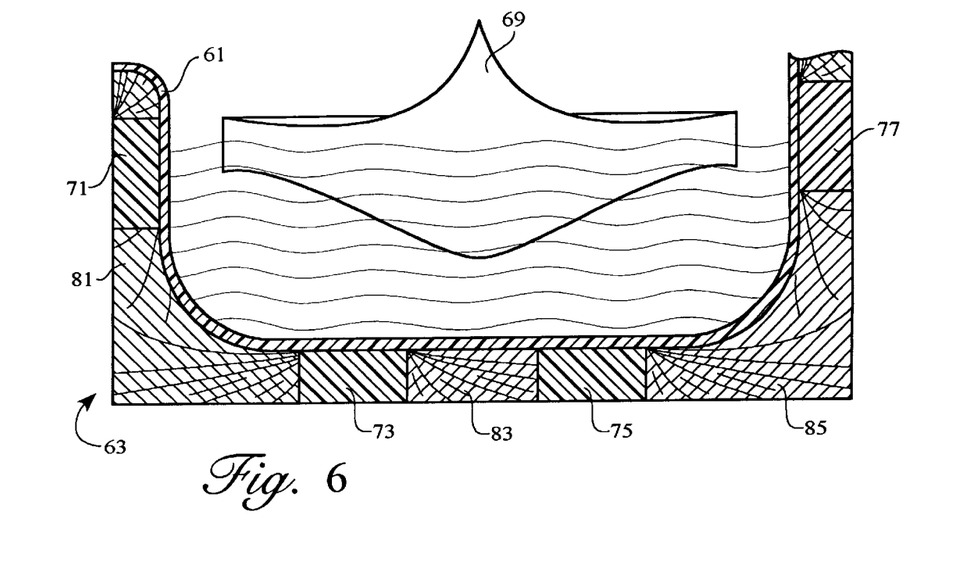
FIG. 6 is a cross-sectional view of a watercourse in accord with the present invention.

In FIG. 6, a watercourse section may be seen with the width of liner 61 slightly exceeding the width of sushi boat 69. The liner includes projecting strips 71, 73, 75 and 77 which are rails which mate with support ribs 81, 83, 85. The support ribs have deep notches to receive the rails which are protrusions from the liner 61, serving to seat the liner within the support structure in an accurately aligned position. The support structure has a generally flat bottom, without a flow gradient. Flow is provided by jets, not shown, causing water to circulate in selected directions.

Liner sections are constructed of fiberglass with the interior part of the liner having a gel coat finish of approximately 0.020 inches. The watercourse can be fabricated of any material, such as stainless steel, wood, ceramic, plastic or glass. The liner is molded in a conventional manner using forms, with straight sections, curved sections and Y-shaped sections. The various sections are joined together by overlap, bonding and sanding. The thickness of the liner is approximately 0.25 inches. The modularity of the sections allows the watercourses to have various shapes, not only loops, as shown in FIG. 1 but tortuous paths of any circulating configuration. The straight, curved and Y-shaped sections may be considered to be analogous to rain gutter which conforms to the perimeter of the roof of a structure. The modularity of rain gutter allows almost any shape to be accommodated. The same is true with the present invention where interesting serpentine patterns may be devised, with multiple circulating loops, all controlled by gates.

Figure 7:
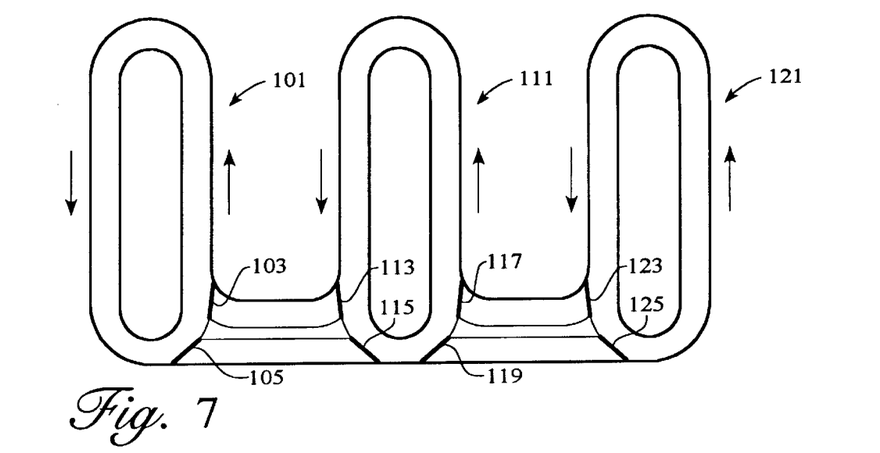
FIGS. 7–9 are top plan views of watercourse loops with diverse gate configurations.

With reference to FIG. 7, a plurality of watercourses 101, 111 and 121 are shown. Watercourse 101 has gates 103 and 105 in place. Watercourse 111 has gates 113 and 115 in place on one side of the loop and gates 117 and 119 in place on the opposite side of the same loop. Loop 121 has gates 123 and 125 in place. This positioning of gates allows the three watercourses to operate independently of each other. Sushi boats in watercourse loop 101 are restricted to that loop. Similarly, sushi boats in each of the watercourses 111 and 121 are restricted to their respective loops.

Figure 8:
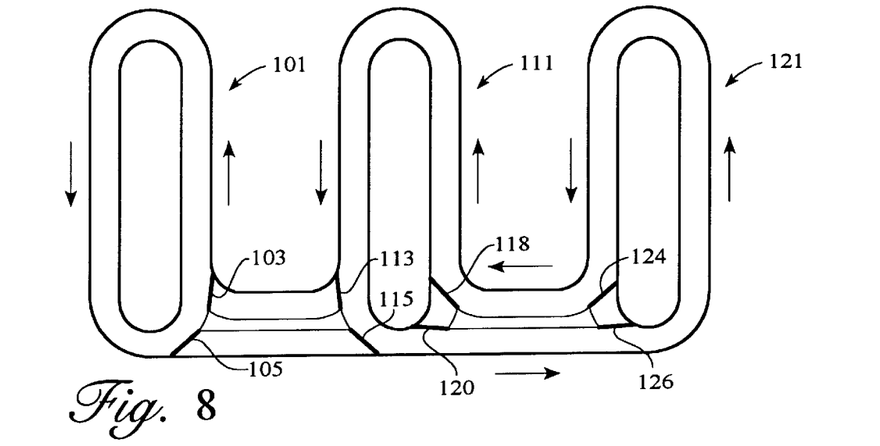

With reference to FIG. 8, loop 101 has gates 103 and 105 in place, as in FIG. 7. Accordingly, loop 101 is isolated, and all sushi boats in that loop remain there. In loop 111, gates 113 and 115 are in the same positions as in FIG. 7, but now gates 118 and 120 have been newly positioned, and gates 117 and 119 have been removed. In loop 121, gates 124 and 126 have been newly positioned, and gates 123 and 125 have been removed. This new configuration of gates allow sushi boats in loop 111 to travel to loop 121 and the boats in loop 121 to travel to loop 111 in a mutual exchange of boats. Boats moving from loop 111 toward loop 121 use the lower shunt, while boats moving from loop 121 toward loop 111 use the upper shunt in a continuous flow circulation path between loop 111 and loop 121.

Figure 9:
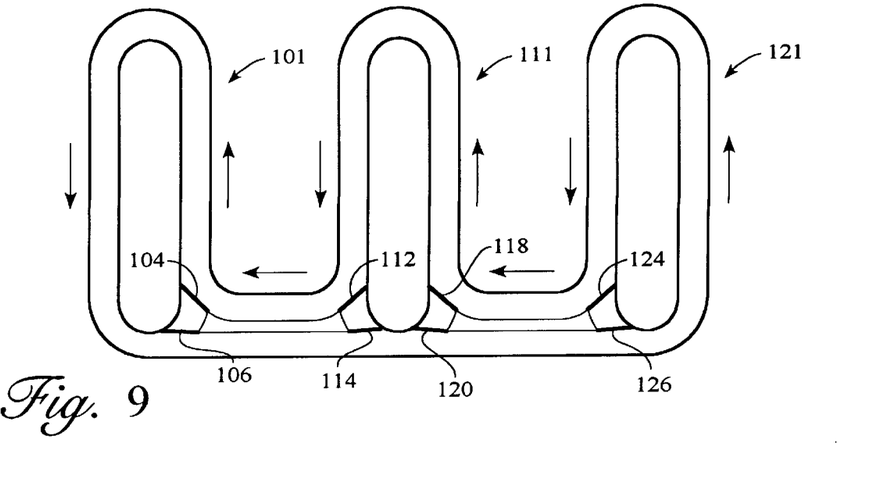

In FIG. 9, loop 101 has been reconfigured with gates 103 and 105 removed and gates 104 and 106 inserted in place. In loop 111, gates 113 and 115 have been removed, and gates 112 and 114 have been inserted. The remaining gates remain the same, namely gates 118, 120, 124 and 126. This arrangement of gates allows boats to traverse all three loops. Boats in loop 101 will travel from that loop, using the bottom shunt, and be directed to loop 121. Once traversing loop 121, the boats will move using the upper shunt to loop 111, and after traversing this loop, travel on an upper shunt to loop 101. From FIGS. 7–9, it will be seen that multiple loops can be configured by means of movable gates so that different combinations of watercourse loops can be linked together or totally isolated from each other.

Figure 10:
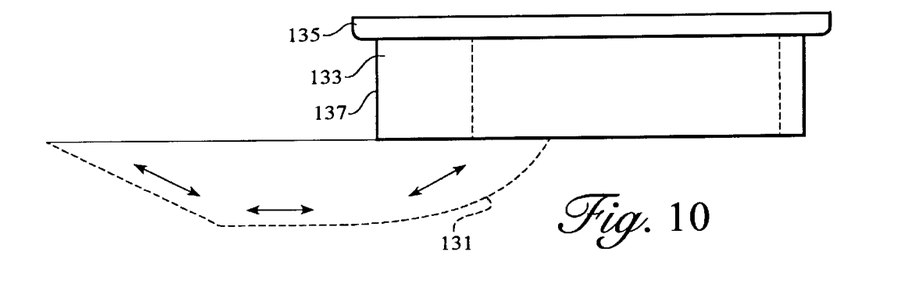
FIG. 10 is a side plan view for access to the interior of a watercourse loop by a handicapped person.

With reference to FIG. 10, to facilitate access to watercourse loops by handicapped persons, a subfloor access ramp 131 is provided so that a person in a wheelchair can enter the central spaced of a watercourse loop beneath table 133 supporting the watercourse structure 135. A hinged section of the floor, not shown, may be raised and lowered to allow entry of a person from below floor level. The maximum depth of the subfloor pathway is approximately four feet, allowing a person in a wheelchair to pass below the edge 137 of table 133.

Figure 10A:
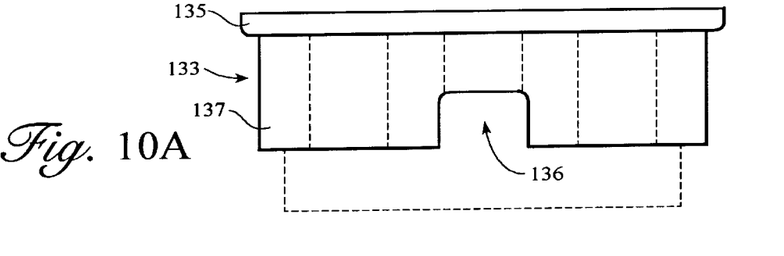
FIG. 10A is a front plan view of the apparatus of FIG. 10.

With reference to FIG. 10A, the back edge 137 of table 133 may be seen to have a cut-out region 136 allowing head room for entering the central region of a watercourse loop. The height of the cut-out region is approximately eighteen to twenty-four inches, and the width is approximately twenty-four to thirty-six inches.

Figure 11:
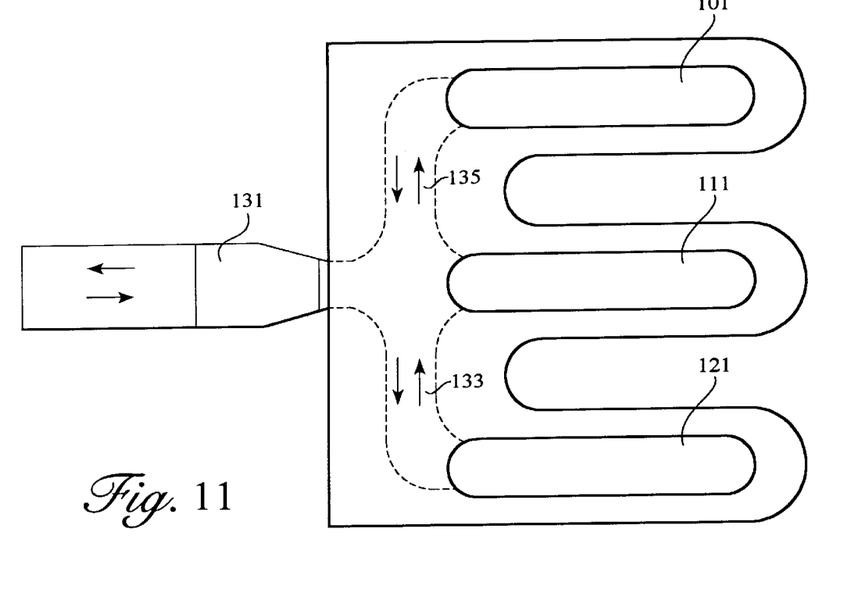
FIG. 11 is a top plan view of the apparatus of FIG. 10.

In FIG. 11, the sub-surface path 131 is seen to provide access to the central regions of each of the watercourse 101, 111 and 121. This access is by means of branched paths 133 and 135 which are sufficiently wide to accommodate a wheelchair. In this manner, a handicapped sushi chef may ride in a wheelchair beneath the table supporting the watercourse, ducking his head until entering the opening in the center of each of the watercourses. If desired, the paths can be made deeper to allow easier access.

What is claimed is:
1. A confiqurable sushi bar comprising,
    a plurality of spaced apart watercourse loops having cross-sectional dimensions for accommodating floating sushi boats, and arranged to form a sushi bar for sushi dining service, and a plurality of first and second watercourse shunts connecting said spaced apart watercourse loops, the first and second shunts having water flowing therein, whereby the sushi bar my be configured to a desired arrangement of watercourse loops.

2. The apparatus of claim 1 further defined by a plurality of selectively movable gates associated with the watercourse shunts, having dimensions suitable for blocking sushi boats, thereby forcing sushi boats along desired paths.

3. The apparatus of claim 1 wherein said plurality of spaced apart watercourse loops are in parallel, spaced apart relation.

4. The apparatus of claim 1 wherein the number of watercourse loops is greater than one.

5. The apparatus of claim 1 wherein the watercourse loops each have a clear central region sufficiently large to be occupied by a person with food preparation and handling equipment.

6. The apparatus of claim 1 wherein said watercourse loops and watercourse shunts comprise a plurality of modular sections, analogous to rain gutters, with straight sections, curved sections and Y-shaped sections, all joined together to form a unitary watercourse structure.

7. The apparatus of claim 1 wherein said watercourse loops have cross sectional portions which have bottom walls with rounded corners connecting to upwardly extending sidewalls which are asymmetric relative to each other.

8. The apparatus of claim 1 wherein said watercourse loops have an inner water-impervious liner and an outer support structure.

9. The apparatus of claim 1 having water flowing in the plurality of watercourse loops and shunts in a complementary manner wherein a sushi boat from one watercourse may be accepted in a shunt and directed to another watercourse, thereby defining a flow pattern.

10. The apparatus of claim 9 wherein said flow pattern extends over all watercourses so that a sushi boat in one watercourse will reach all watercourses.

11. The apparatus of claim 1 wherein said watercourse loops have moveable gates capable of diverting boats.

12. The apparatus of claim 1 wherein said gates may be configurable to isolate one or more watercourse loops from other loops.

13. The apparatus of claim 1 wherein said watercourse loops are supported from a floor having a subsurface tunnel, said tunnel of a size sufficient to accommodate a person in a wheelchair, allowing access to the central area by travelling beneath a portion of the watercourse loops.

14. A configurable sushi bar comprising, a plurality of spaced apart watercourse loops having cross-sectional dimensions for accommodating floating sushi boats and arranged to form a sushi bar for dining service, the floating sushi boats transporting comestibles along the sushi bar, watercourse shunts interconnecting the spaced apart watercourse loops, the loops and shunts having water flowing therein in a manner directing water from one watercourse loop into another watercourse loop, and a plurality of movable gates disposed in a manner capable of blocking sushi boat access to a selected watercourse, whereby the sushi bar may be configured to a desired arrangement of watercourse loops.

\* \* \* \* \*

UNITED STATES PATENT AND TRADEMARK OFFICE
CERTIFICATE OF CORRECTION

PATENT NO.    : 6,179,088 B1
DATED         : January 30, 2001
INVENTOR(S)   : Len-Sun Lai

It is certified that error appears in the above-identified patent and that said Letters Patent is hereby corrected as shown below:

<u>Title page, Item [54] and Column 1, lines 1 and 2,</u>
Title of invention "INTERLINKED WATERCOURSES FOR SUSHI BOATS" should read:

-- SUSHI BAR HAVING INTERLINKED WATERCOURSES FOR SUSHI BOATS --.

Signed and Sealed this

Third Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.    : 6,179,088 B1
DATED         : January 30, 2001
INVENTOR(S)   : Lai It is certified that error appears in the above-identified patent and that said Letters Patent is hereby corrected as shown below:

Title page,
Item [*] Notice, delete the phrase "by 0 days" and insert -- by 39 days --

Signed and Sealed this

Twenty-eighth Day of September, 2004

JON W. DUDAS
*Director of the United States Patent and Trademark Office*